Oct. 26, 1965 D. MITCHELL 3,214,526

ECHO SUPPRESSOR WITH IMPROVED BREAK-IN

Filed Dec. 29, 1961 3 Sheets-Sheet 1

INVENTOR
D. MITCHELL
BY [signature]
ATTORNEY

Oct. 26, 1965 D. MITCHELL 3,214,526

ECHO SUPPRESSOR WITH IMPROVED BREAK-IN

Filed Dec. 29, 1961 3 Sheets-Sheet 2

INVENTOR
D. MITCHELL
BY [signature]
ATTORNEY

Oct. 26, 1965 D. MITCHELL 3,214,526

ECHO SUPPRESSOR WITH IMPROVED BREAK-IN

Filed Dec. 29, 1961 3 Sheets-Sheet 3

INVENTOR
D. MITCHELL
BY [signature]
ATTORNEY

United States Patent Office 3,214,526

Patented Oct. 26, 1965

3,214,526
ECHO SUPPRESSOR WITH IMPROVED BREAK-IN

Doren Mitchell, Martinsville, N.J., assignor to Bell Telephone Laboratories, Incorporated, New York, N.Y., a corporation of New York Filed Dec. 29, 1961, Ser. No. 163,183
6 Claims. (Cl. 179—170.6)

Figure 1:
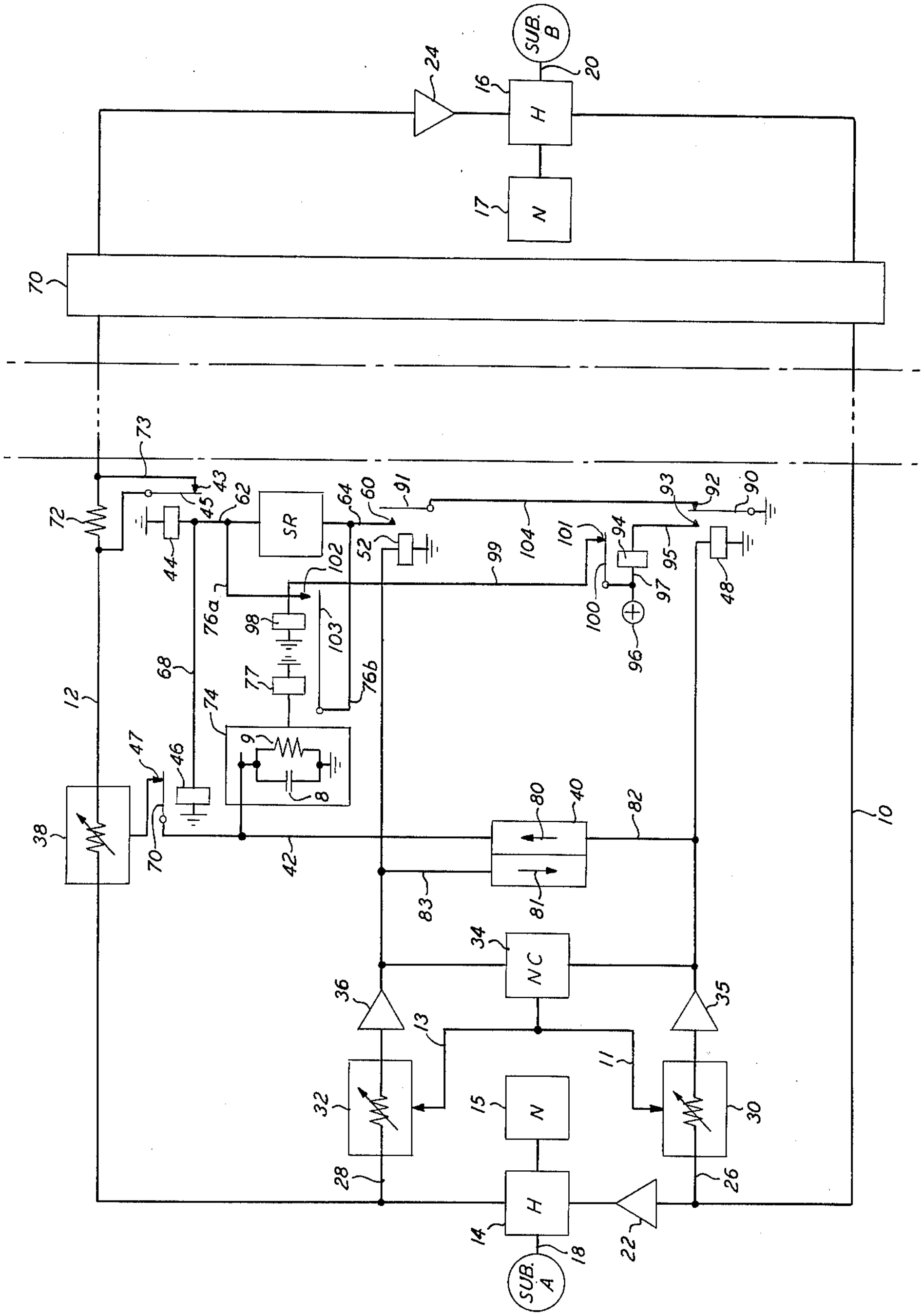

This invention relates to a split terminal echo suppressor for use in telephone systems involving both two-wire and four-wire circuits and more particularly to improved break-in arrangements for split terminal echo suppressors.

Two-way flow of conversation in two-wire to four-wire telephone systems which utilize echo suppressors is greatly facilitated by incorporating break-in equipment in the echo suppressors. A suppressor employing such an arrangement is characterized by the ability of a second subscriber to disable the echo suppressor associated with his terminal simply by speaking albeit a first subscriber at the other terminal is still talking.

The most prevalent break-in system associated with echo suppressors is the amplitude type. This system operates by comparing the relative amplitudes of the signals existing in the transmitting and receiving paths in the four-wire portion of the telephone system. Thus whenever the amplitude of the speech signals generated by the second subscriber is greater than the amplitude of the echoes normally encountered in the transmitting path of the second speaker the break-in equipment will be activated. The inherent disadvantage of the foregoing type of arrangement is its reliance upon the supposition that the interrupting speaker will be able to produce signals of a sufficient amplitude to disable the suppressor associated with his terminal. It is quite obvious that if the interrupter is a so-called "weak" speaker he may never be able to disable the suppressor.

A second type of break-in equipment is the so-called time-logic system disclosed in the application of R. R. Riesz Serial No. 163,182, filed on even date herewith and assigned to the same assignee as the present application. This break-in system operates by detecting the condition of "double-talking" (i.e., that condition wherein speech signals are being received from a first or far end speaker in the receiving path and speech signals produced by the second or near end speaker are being transmitted in the transmission path) and thereupon operates to disable the echo suppressor associated with the terminal of the interrupting party. However, a condition is imposed on this type of arrangement viz: that the suppressor disabling provision must be held operative for some time after the condition of double-talking has ceased, so that compensation may be made for pauses in the interrupter's speech. (If this delay were not incorporated into the break-in equipment portions of the interrupter's speech would be attenuated due to the constant operation and disablement of the echo suppressor.) Usually the suppressor is disabled for about one second after the condition of double-talking has ceased. The inherent disadvantage of this type of arrangement lies in the fact that for a specified interval after cessation of double-talking, echoes will not be attenuated.

The primary object of the present invention is to provide break-in arrangements for use in echo suppressors which can be operated by a weak speaker to disable the suppressor but which will allow control of the suppressor to be regained a short interval after cessation of double-talking.

Another object of the present invention is to gain the advantages of two known methods of break-in and to eliminate their disadvantages.

Accordingly, the invention comprises a vario-losser type of echo suppressor which introduces attenuation in the transmission path of the four-wire telephone system in proportion to the difference in amplitude of the signals existing in the transmitting and receiving paths. When speech signals produced by both the near end and far end subscribers are detected at the near end terminal, the circuits of the present invention operate to disable the echo suppressor associated with the terminal of the interrupter (i.e., the near end terminal). When the condition of double-talking has ceased, a circuit is actuated very soon to disconnect the break-in arrangement and allow operation of the vario-losser in the echo suppressor. The interval of time required to operate the suppressor after the interrupter has stopped speaking is considerably shorter than the interval of time during which the echo suppressor would be disabled if only time-logic break-in circuitry were used.

Figure 2:
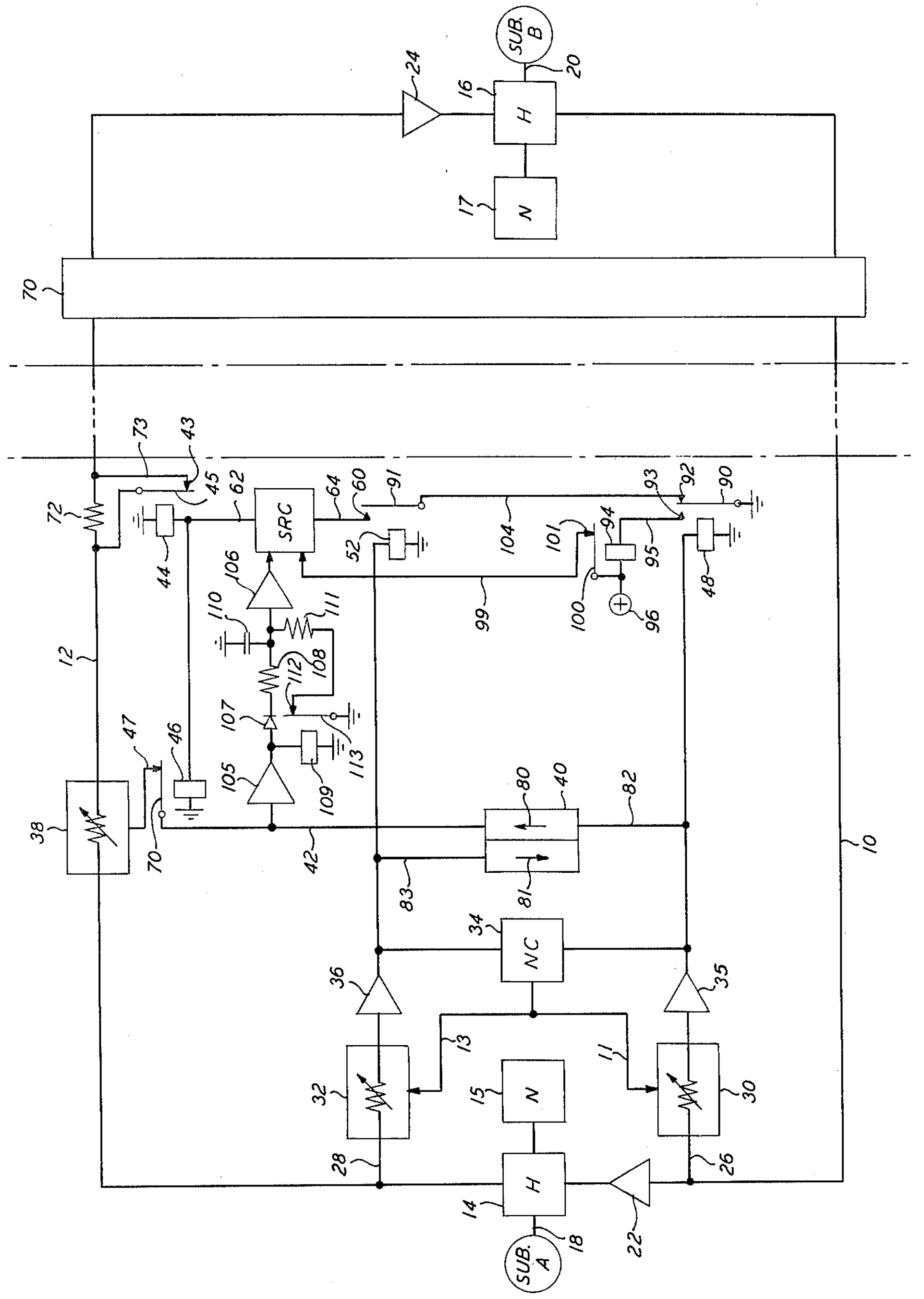
Figure 4:
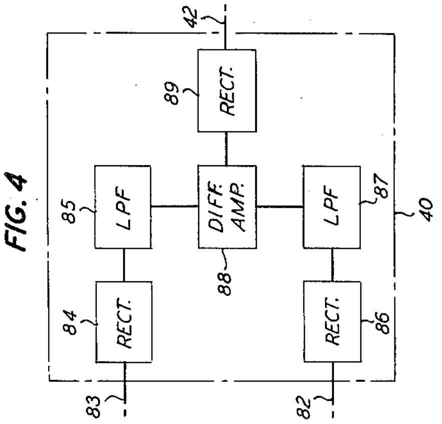
Figure 3:
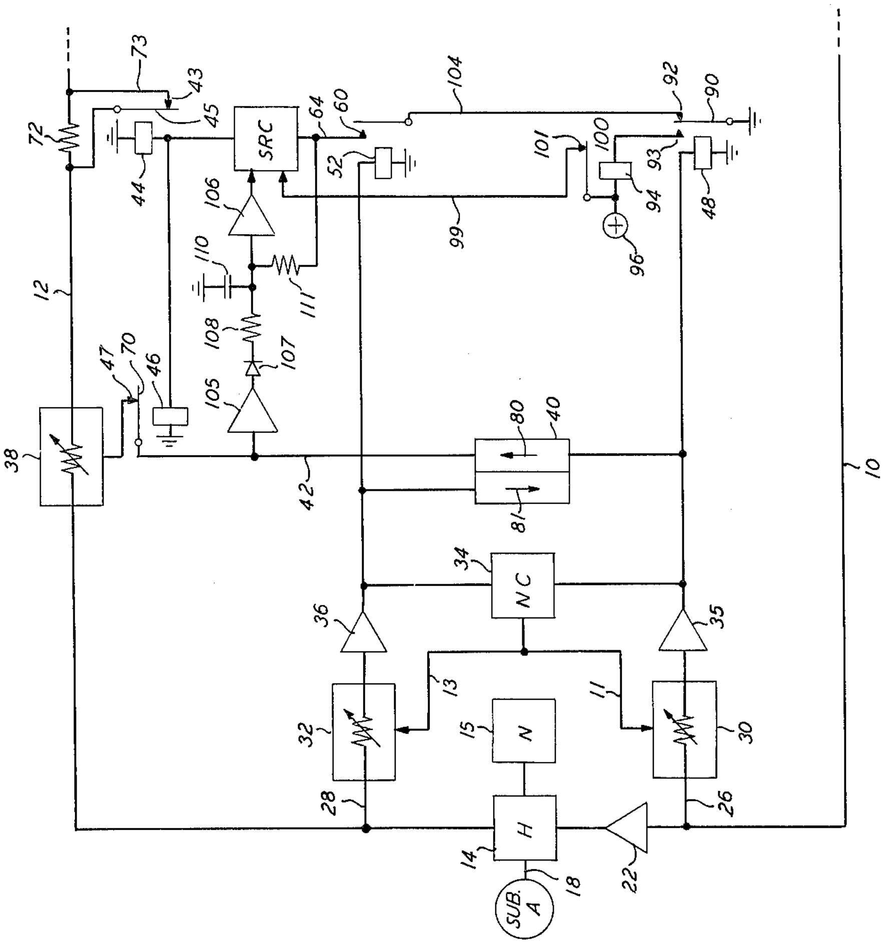

The above and other features of the invention will be more clearly understood following a consideration of the following detailed description taken in conjunction with the drawings wherein:

FIG. 1 is a partial block schematic diagram of an echo suppressor wherein the circuitry of the present invention incorporates an integrating circuit;

FIGS. 2 and 3 are block schematic diagrams of an echo suppressor wherein the present invention incorporates slow-operate-quick-release circuits; and FIG. 4 is a block schematic diagram of the circuit elements which may comprise the comparator circuit 40 shown in FIGS. 1, 2 and 3.

Each transmission line in the figures represents two leads in the actual telephone system. Since the invention relates to a split terminal type of echo suppressor only one suppressor, that associated with subscriber A, is disclosed in detail. It is to be understood that the other echo suppressor (associated with subscriber B) is an exact replica of the suppressor described in the following paragraphs. Like numerals in the figures indicate similar elements.

The four-wire telephone transmission system shown in FIG. 1 comprises paths 10 and 12. These paths are connected through the hybrid coils, indicated schematically as 14 and 16, respectively, and through leads 18 and 20, respectively, to subscribers A and B, respectively. Hybrid coils 14 and 16 are terminated in balancing networks 15 and 17, respectively. Isolation amplifiers 22 and 24 are serially connected in paths 10 and 12, respectively, and both amplify the signals existing in these paths and prevent the entrance of the signals produced by the subscribers into the receiving paths respectively associated with the terminals of the two subscribers.

In the echo suppressor associated with terminal "A," a lead 26 is connected to lead 10 of the four-wire system and a lead 28 is connected to lead 12 of the four-wire system. Vario-lossers 30 and 32 (indicated schematically as variable resistors) are serially connected in leads 26 and 28, respectively, and are operated, through leads 11 and 13, by Nogad (noise operated gain adjusted device) control 34 which is connected across leads 26 and 28. The Nogad, which comprises lossers 30 and 32 and control 34 may be of any of the types which are well known in the art. One-way amplifiers 35 and 36, which are connected to vario-lossers 30 and 32, respectively, amplify the signals in leads 26 and 28 after the signals have been attenuated by the respective vario-lossers.

A vario-losser 38, shown schematically as a variable resistance, is serially connected in line 12 and is adapted to be operated by the comparator circuit 40 via a control lead 42 and the operated armature 70 and contact 47 of a relay 46. Circuit 40 is connected to leads 26 and 28 by the leads 82 and 83, respectively. The comparator circuit 40 is divided into right-hand and left-hand sections as shown for the respective detection and comparison of speech signals on leads 26 and 28, respectively. Thus, the signals applied to control lead 42 from circuit 40 will be proportional to the difference between the amplitudes of the signals existing on leads 26 and 28.

By way of example, the comparator circuit 40 may include the elements shown in FIG. 4. Thus, a series circuit comprising a rectifier 84 and a low pass filter 85 is connected to lead 83. Likewise, a series circuit comprising a rectifier 86 and low pass filter 87 is connected to lead 82. The output signals of both low pass filters are applied to the input terminals of the differential amplifier 88. The output signal of the differential amplifier, which will be proportional to the difference between the input signals and hence, to the difference between the amplitudes of signals existing on leads 26 and 28, is applied to lead 42 through a rectifier 89. Vario-losser 38 may be any of the current controlled impedance devices well known in the art.

Lead 26 is also connected to ground through the winding of a relay 48. Relay 48 controls the operation of armature 90 which is connected to ground. When the winding of relay 48 is de-energized, armature 90 will be connected to contact 92; when the winding of relay 48 is energized, armature 90 will be connected to contact 93. The winding of a relay 94 is connected between contact 93, by a lead 95, and a source 96, by a lead 97. The winding of a relay 98 is connected between ground and lead 97 by a lead 99 and the operated armature 100 and contact 101 of relay 94.

The winding of a relay 52 is connected between lead 28 and ground. Relay 52 controls the operation of armature 91. Thus, when the winding of relay 52 is de-energized, armature 91 will not be connected to any part of the circuit; when the winding of relay 52 is energized, armature 91 will be connected to contact 60. Armature 91 is connected to contact 92 by a lead 104.

Relays 48, 94 and 52 have different release times (i.e., that interval of time the relay will maintain the armature attracted after the relay winding has been de-energized) which may be, for example, 0.05 second for relays 48 and 94 and zero second for relay 52. It is to be emphasized that the delay times recited in the preceding sentence and the subsequent paragraphs are mentioned by way of example only and the invention is not to be limited to these intervals of time.

Contact 60 of relay 52 is connected to a slow-release circuit SR by lead 64. The winding of a relay 44 is connected between the slow-release circuit and ground by a lead 62, and the winding of a relay 46 is connected between SR and ground by a lead 68. The operation of the slow-release circuit will energize relays 44 and 46 and will maintain these relays energized for a predetermined interval of time after the SR circuit has been de-energized which, for example, may be one second. An impedance 72, shown symbolically as a resistor, is connected in transmission path 12 and is normally shorted out by way of lead 73 and the operated armature 45 and contact 43 of relay 44.

Control lead 42 (in addition to connecting vario-losser 38 to the comparator circuit, as noted above) joins the output terminals of comparator circuit 40 to the input terminals of an integrating circuit 74 comprising a resistor 9 connected in parallel with a capacitor 8. The winding of a relay 77 is connected between the output terminal of integrator 74 and ground. Relays 77 and 98 control the operation of armature 103, which is connected to lead 64 by a lead **76*b*. When either of these relays is energized armature 103 will be connected to contact 102, which is connected to lead 62 by a lead 76*a*, to thereby cause a short circuit to exist about the SR circuit through the elements comprising leads 62 and 76*a*, contact 102, armature 103, and leads 76*b* and 64**. This disables SR and also wipes out any slow release action which may have been stored in it.

As noted hereinabove, the echo suppressor associated with the terminal of subscriber B contains the same circuitry as that described above and is therefore indicated only as a block 70. The operation of the present invention is considered in the subsequent paragraphs in which the functions of the suppressor equipment at terminal A are considered.

Under normal conditions (when no speech signals exist in either receiving path 10 or transmitting path 12) relays 48, 94, 52, 44, 46, and 77 will be de-energized. Battery 96 will energize the winding of relay 98 through lead 99 and the operation of armature 100 and contact 101 to cause SR circuit to be shorted, in the manner noted above. Comparator circuit 40 will be connected to vario-losser 38 by lead 42, through contact 47 and armature 70. Impedance 72 will be shorted by the circuit comprising lead 73, contact 43 and armature 45. Nogad control 34 will adjust the vario-lossers 30 and 32 to prevent false operation of element 40 and relays 48 and 52 by any noise signals which may exist in the transmitting or receiving paths.

If it is now assumed that subscriber B is speaking, the signals will be transmitted to subscriber A through path 10, amplifier 22, hybrid coil 14 and lead 18. A portion of these signals will also pass through vario-losser 30 and amplifier 35 and to relay 48, which is connected to lead 26. The signals present on lead 26 will be detected by the right half of comparator circuit 40, as shown by arrow 80 in the drawing to thereby cause attenuation to be introduced into path 12 by means of vario-losser 38. Since relay 48 will now be energized, armature 90 will be connected to contact 93 thereby providing a path for the current from source 96 through the winding of relay 94. The energization of relay 94 will cause armature 100 to be disconnected from contact 101, thereby de-energizing relay 98 and causing the short circuit which paralleled the SR circuit to be opened. If any echoes are present, they will appear on lead 28 and be detected in the left-hand portion of 40 and also cause relay 52 to operate. However, the amplitude of the echo signal will not, as is common in a system of this type, have any appreciable effect on the output of device 40. Although armature 91 will be connected to contact 60, SR will not be energized since the circuit will be opened between contact 92 and armature 90. That is, the time patterns of the signals on leads 26 and 28 coincide and cause the relays to operate in unison.

Assuming that subscriber A begins to speak at the same instant subscriber B is speaking, the speech signals produced by A will be attenuated to a high degree in the vario-losser 38. However, the signals representative of subscriber A's speech will also pass through vario-losser 32 and amplifier 36 and into the left section of circuit 40, as shown by the arrow 81 in the drawing. If the signals entering the left half of circuit 40 are of sufficient amplitude, the loss introduced in path 12 by vario-losser 38 will be reduced to zero.

Albeit the signals produced by subscriber A are not strong enough to eliminate the attenuation in path 12, due to the operation of vario-losser 38, the signals will operate relay 52. When there is a pause in the speech transmitted from B relay 48 will be de-energized. After 0.05 second, relay 48 will release armature 90, thereby reconnecting armature 90 to contact 92. It is to be noted that although relay 48 will release the armature associated with it (90) 0.05 second after speech from B has stopped, thereby causing relay 94 to de-energize, relay 94 will not release armature 100 until 0.1 second after speech from subscriber B has stopped. That is, it takes 0.05 second for relay 48 to allow armature 90 to be disconnected from contact 93 and it takes an additional 0.05 second for relay 94 to allow armature 100 to be reconnected to contact 101.

If it is assumed that the intersyllabic lulls in subscriber B's speech patterns are greater than 0.05 second but less than 0.1 second, armature 90 will be connected to contact 92 and relay 98 will still remain de-energized thereby allowing the SR circuit to be operated. If, now, relay 52 is operated by subscriber A's speech, a ground will be applied to the SR circuit through the circuit comprising armature 90, contact 92, lead 104, armature 91, contact 60, and lead 64, thereby energizing the circuit. That is, the circuit will be energized because the time patterns of the signals on leads 26 and 28 do not coincide (in accordance with the "time logic" type of break-in detection).

Upon being energized, in the manner indicated above, the SR circuit will thereupon energize relays 44 and 46. Relay 46 will attract armature 70 causing the vario-losser 38 to be disconnected from control lead 42 with the result that the attenuation introduced by 38 will be reduced by some predetermined value. At the same time the control lead is disconnected, relay 44 will cause an open circuit to exist in lead 73 by disconnecting armature 45 from contact 43. This will cause impedance 72 to be connected in path 12. The value of this impedance is so chosen so that the echoes existing in path 12 will be attenuated somewhat but the speech signals will not be adversely affected.

Accordingly, when speaker A ceases speaking the signals from subscriber B will be detected by the right section of comparator circuit 40 thus causing a greater signal to appear at the output terminals of the comparator circuit than would appear if signals from both subscribers were detected. This signal will be applied to the input terminals of integrating circuit 74 by way of control lead 42. The integrating circuit will apply a rising potential to the winding of relay 77 in response to the potential applied to the input terminals via lead 42. When a predetermined level of potential is reached, as determined by the circuit elements, relay 77 will cause contact 102 and armature 103 to be operated thereby shorting the SR circuit through leads 76*a* and 76*b*. This action will cause relays 46 and 44 to de-energize immediately, thus reconnecting vario-losser 38 and control circuit 40. The value of potential required for the operation of relay 77 may be chosen so that even if subscriber B is a weak speaker, the maximum interval of time would be in the vicinity of 100 milliseconds before the relay would operate.

After subscriber A ceases speaking relay 52 will be de-energized thereby disconnecting the ground and de-energizing the SR circuit. Normally relays 44 and 46 would not be de-energized until approximately one second, due to the action of the SR circuit, if subscriber B continued talking. This can result in somewhat objectionable echoes for up to one second after a period of double talking.

However, the arrangement according to the present invention will cause the comparator circuit to be reconnected to the vario-losser, through contact 47 and armature 70, in a substantially shorter interval of time. (It is still assumed that the pauses in subscriber B's speech pattern are less than 0.1 second; if the pauses were greater, relay 94 would be de-energized thereby allowing relay 98 to be energized and thus causing SR to be de-energized in 0.1 second in the manner noted in the preceding paragraphs.) The value of the elements which comprise the integrating circuit and relay 77 are so chosen that the output from circuit 40, when both subscribers are speaking, will not cause operation of relay 77. However, the charge which accumulates on capacitor 8 is dependent upon the amplitude and duration of the signals produced by the comparator circuit. Thus, in some instances, it might be desirable to provide some means to quickly discharge the capacitor either during double-talking or when subscriber B ceases speaking to prevent operation of relay 77 albeit both subscribers are speaking. This may be accomplished in the manner described below.

In another embodiment shown in FIG. 2, the integrating circuit 74 of FIG. 1 is replaced by a slow operate-quick release circuit arrangement. It is to be understood that circuit elements 76*a*, 76*b*, 102, 103, 98 and 77 of FIG. 1 are not shown in FIG. 2, but have been included within the slow release circuitry and are thus within the box labeled SRC in FIG. 2. In this embodiment the input terminals of an amplifier 105 are connected to lead 42. The output terminals of amplifier 105 are connected to the input terminals of a second amplifier 106 through a series circuit comprising a diode 107 and an impedance 108. The winding of relay 109 is connected between the output terminals of amplifier 105 and ground. A capacitor 110 is connected between impedance 108 and the input terminals of amplifier 106 and ground. An impedance 111 is also connected to the input terminals of amplifier 106 and through the operated contact 112 and armature 113 of relay 109 to ground. The output terminals of amplifier 106, although shown terminating at the SRC circuit in FIG. 2 are to be understood as being connected to the winding of a relay such as 77 in FIG. 1. Likewise lead 99 in FIG. 2 would be connected to the winding of a relay such as relay 98 in FIG. 1.

Since the same elements which comprise the break-in circuitry of FIG. 1 are shown in FIG. 2 it is obvious that the operation of the break-in circuitry depicted in FIG. 2 will be identical to the operation of the break-in circuitry depicted in FIG. 1. However, the operation of the disconnect circuitry is as follows. If it is assumed speaker A has ceased speaking, the output of amplifier 105 will be proportional to the amplitude of subscriber B's speech. When the output of amplifier 105 reaches a predetermined value relay 109 will be energized thereby disconnecting armature 113 from contact 112. The output signals from amplifier 105 will be rectified by diode 107 and thereby charge capacitor 110. The rate of buildup of charge on capacitor 110 will therefore depend on the amplitude of B's speech. However, at the end of each speech spurt of subscriber B, condenser 110 will be immediately discharged as illustrated in the following description of operation. Relay 109 will de-energize thereby thereby providing a path to ground for the charge on capacitor 110; the path comprises impedance 111, contact 112, and armature 113. Thus, the maximum charge for each speech spurt will depend on both time and amplitude of subscriber B's speech pattern. The signal across capacitor 110 will be applied as an input to amplifier 106 and the output signal will control a relay such as 77 of FIG. 1. Hence, when the charge on capacitor 110 builds up to a predetermined value, the SRC circuit will be canceled and the echo suppressor will be put back in the circuit in the same manner as described in conjunction with FIG. 1. This arrangement allows strong speech from B, even without pauses, to get the echo suppressor in operation considerably sooner than with time logic alone. It is to be noted, however, that it will still be very easy for SRC to be operated again when there is double-talking since the output of circuit 40 and hence the input signal to amplifier 105 will soon cause the charge on the capacitor 110 to fall below the aforementioned predetermined value. Thus, this arrangement, in effect, requires the total energy in one of subscriber B's speech spurts to be above a predetermined value to operate the disconnect equipment.

In a third embodiment, subscriber B is allowed to store energy between syllables, only if subscriber A does not speak. Thus, even if subscriber A is a so-called "weak speaker" he can cause the energy stored by subscriber B to be dissipated.

This third embodiment is depicted in FIG. 3 and has a somewhat different action than the circuit shown in FIG. 2. In FIG. 3 only the echo suppressor associated with subscriber A is shown, it being understood that the echo suppressor associated with the other terminal is identical to this one. In this embodiment, as in FIG. 2, the input terminals of amplifier 105 are connected to lead 42. The output terminals of amplifier 105 are connected to the input terminals of amplifier 106 through the series circuit comprising diodes 107 and impedance 108. Capacitor 110 is connected between the input terminals of amplifier 106 and ground. Impedance 111 is connected between the input terminals of amplifier 106 and lead 64. As in FIG. 2, amplifier 106 of FIG. 3 may be connected to a relay such as relay 77 (FIG. 1).

In this embodiment capacitor 110 will be discharged only when relay 52 is energized and relay 48 is de-energized (i.e., when ground is applied to lead 64). That is, capacitor 110 will be discharged only when there is double-talking present and there is a lull of more than 0.05 second in the speech pattern of subscriber B. This circuit will, in effect, allow speech from subscriber B to accumulate a charge on capacitor 110 to thus operate the disconnect circuitry when the potential at the output terminals of amplifier 106 is above the predetermined level necessary to operate a relay such as 77 (FIG. 1). Thus the echo suppressor is placed back in the circuit in a relatively shorter amount of time than if the SRC circuit alone were used.

Hence, even if the interrupting speaker is a weak talker he will be able to overcome the strong talker by disabling the echo suppressor associated with the interrupter's terminal. However, instead of the suppressor being disabled for a long interval of time after cessation of double-talking, as would normally be the case in this type of arrangement, the suppressor will again be put into operation after a relatively short interval of time (i.e., in the vicinity of 100 milliseconds).

What is claimed is:

1. In a telephone transmission system having at least two terminals interconnected by first and second transmission paths, echo suppressors associated with each terminal and each comprising a variable loss connected in said first path, a comparing means connected between said first and second transmission paths and adapted to vary the attenuation introduced by the variable loss in proportion to the amplitude of speech signals in said transmission paths, first means connected to said comparing means and adapted to connect and disconnect said comparing means to said variable loss, time delay means, means connecting said time delay means to said first means, said first means being actuated by said time delay means when said delay means is energized, a second means connected to said second path and capable of being operated between a first and second state by signals in said second path, a third means connected to said first path and adapted to be operated between a first and second state by signals in said first path, means connecting said time delay means to said third means when said second means is in said second state and said third means is in said first state to thereby actuate said time delay means, and a fourth means connected to said time delay means and adapted to disable said time delay means when actuated, actuating means connected to said comparing means and said fourth means and comprising in part a reactance, said reactance producing a potential proportional to the rate and amplitude of the signals in said second transmission path, said actuating means operating said fourth means to disable said time delay means when the potential across said reactance reaches a predetermined level.

2. In a transmission system including at least two terminals interconnected by transmitting and receiving paths, an echo suppressor at each terminal comprising, in combination, first means for comparing the level of signals in said paths and for producing an output signal representative of their difference and means responsive to said output signal for attenuating signals in said transmitting path, second means for comparing the variation of signals in said paths with respect to time and for producing an output when the signals in said paths do not vary simultaneously, disabling means for disabling said echo suppressor, slow-release means responsive to the presence of an output from said second means for operating said disabling means and for maintaining said disabling means operated for a predetermined interval of time after the output from said second means disappears, and means responsive to the reception of a predetermined level of output signal from said first means for rendering said slow-release means inoperative.

3. In a transmission system including at least two terminals interconnected by transmitting and receiving paths, an echo suppressor at each terminal comprising, in combination, first means connected to said paths for comparing the level of the signals in said paths and for producing an output signal representative of their difference and means responsive to said output signal for attenuating signals in said transmitting path, second means for comparing the coincidence of the time patterns of the signals in said paths and for producing an output when the time patterns of the signals in said paths do not coincide, disabling means for disabling said echo suppressor, slow-release means responsive to the presence of an output from said second means for operating said disabling means and for maintaining said disabling means operated for a predetermined interval of time after the output from said second means disappears, third means responsive to the amplitude and duration of the output signal from said first means for rendering said slow-release means inoperative, means for maintaining said slow-release means inoperative, and means responsive to signals in said receiving path for disabling said last-named means.

4. A device as defined in claim 3 wherein said third means comprises an integrating circuit connected to a two-state device, said device changing from a first to second state in the presence of a predetermined output level from said integrating circuit to thereby disable said slow-release means.

5. In a transmission system including at least two terminals interconnected by transmitting and receiving paths, an echo suppressor at each terminal comprising, in combination, first means connected to said paths for comparing the level of signals in said paths and for producing an output signal representative of their difference and means responsive to said output signal for attenuating signals in said transmitting path, a pair of two-state devices respectively connected to said transmitting and receiving paths, each of said devices changing from a first to a second state in the presence of signals in the respective path, means for disabling said echo suppressor, slow-release means for operating said disabling means when said devices are in different states and for maintaining said enabling means operated for a predetermined interval of time after the devices return to the same state, means responsive to the reception of a predetermined level of output signal from said first means for rendering said slow-release means inoperative, and means connected to said last-named means and responsive to the reception of output signals below a predetermined level from said first means for disabling said last-named means.

6. In a transmission system including at least two terminals interconnected by transmitting and receiving paths, an echo suppressor at each terminal comprising, in combination, first means connected to said paths for comparing the level of signals in said paths and for producing an output signal representative of their difference and means responsive to said output signal for attenuating signals in said transmission path, means intermediate said paths and said first means and responsive to the presence of noise signals in said paths for attenuating the noise signals, a pair of two-state devices connected respectively to said transmitting and receiving paths, each of said devices changing from a first to a second state in the presence of signals in the respective paths, disabling means for disabling said echo suppressor, second means for inserting attenuation in said transmission path, slow-release means for operating said disabling means and said second means when the device connected to said transmitting path is in said second state and the device connected to the receiving path is in said first state and for maintaining said disabling means and said second means operated for a predetermined interval of time after the devices return to the same state, means responsive to the reception of a predetermined level of output signal from said first means for rendering said slow-release means inoperative, and means for connecting said last-named means to the pair of two-state devices to render said last-named means inoperative when the device connected to the transmitting path is in said second state and the device connected to the receiving path is in the first state.

No references cited.

ROBERT H. ROSE, *Primary Examiner*.